T. A. C. BOTH.
ELECTRIC LIGHT SOCKET.
APPLICATION FILED APR. 16, 1912.
1,214,644.
Patented Feb. 6, 1917.
3 SHEETS—SHEET 1.
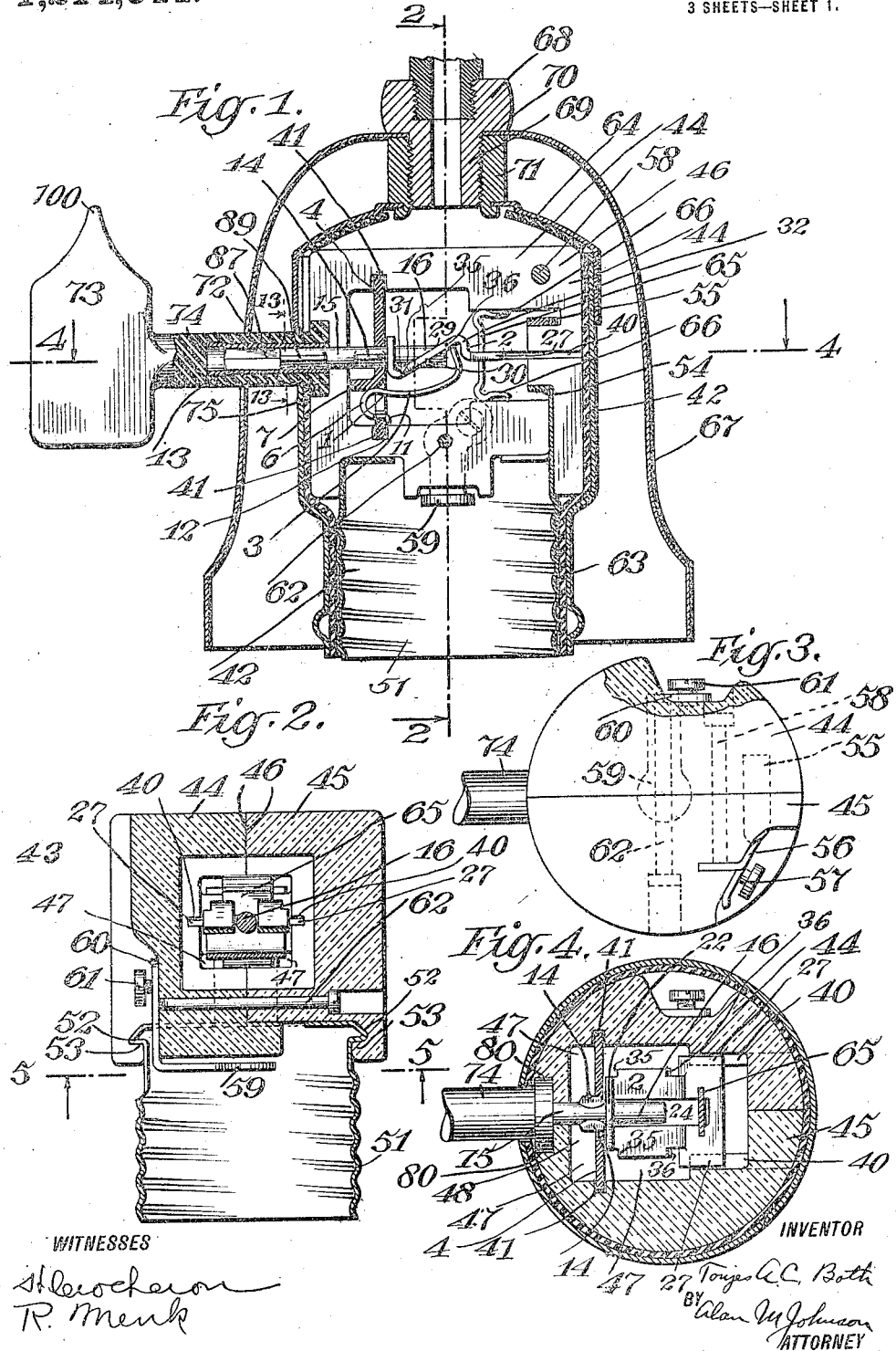

T. A. C. BOTH.
ELECTRIC LIGHT SOCKET.
APPLICATION FILED APR. 16, 1912.
1,214,644.
Patented Feb. 6, 1917.
3 SHEETS—SHEET 2.
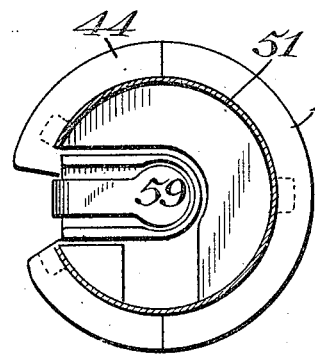
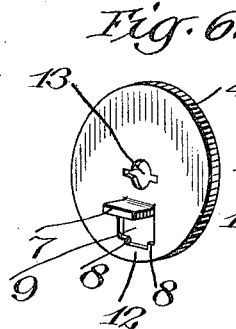
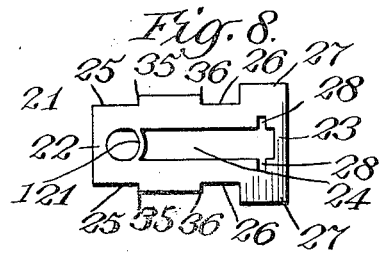
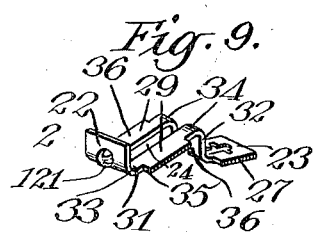
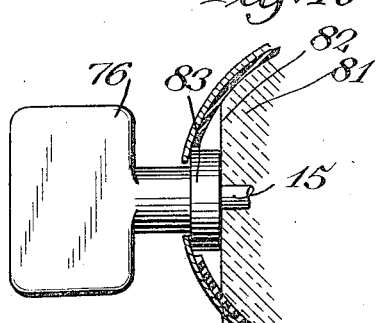
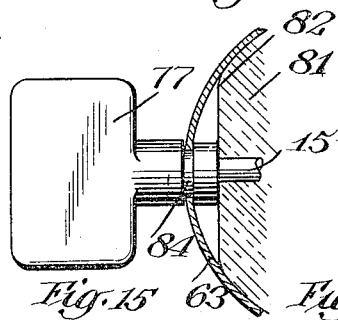
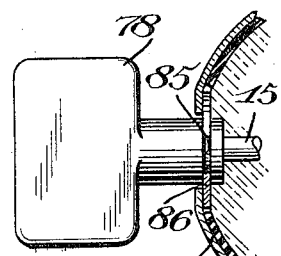
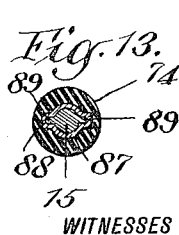
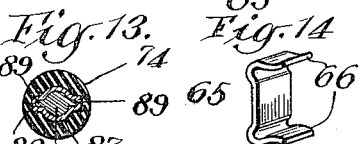
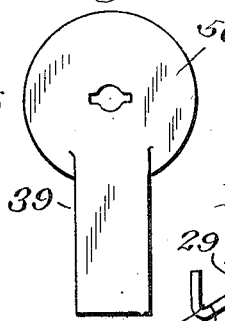
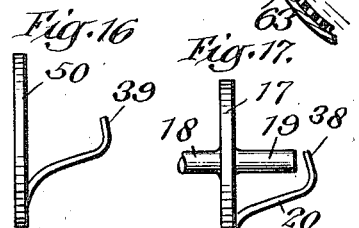
WITNESSES
INVENTOR
Tonjes A.C. Both
BY
Alan M Johnson
ATTORNEY T. A. C. BOTH.
ELECTRIC LIGHT SOCKET.
APPLICATION FILED APR. 16, 1912.
1,214,644.
Patented Feb. 6, 1917.
3 SHEETS—SHEET 3.
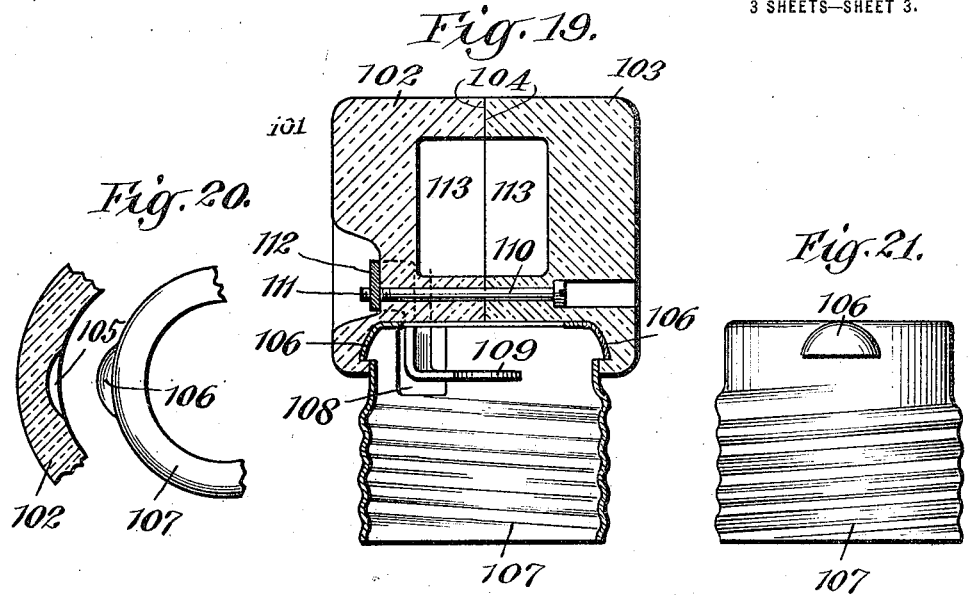
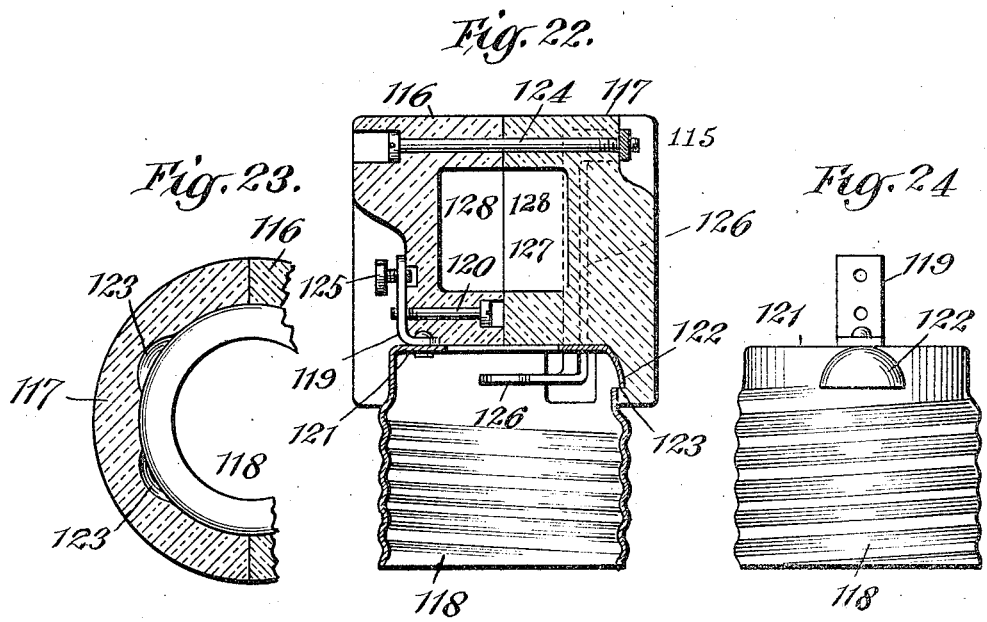
WITNESSES
INVENTOR
BY
ATTORNEY

UNITED STATES PATENT OFFICE.

TONJES AUGUST CARL BOTH, OF MALDEN, MASSACHUSETTS, ASSIGNOR TO THE ZEE SOCKET & MFG. CO., OF BOSTON, MASSACHUSETTS, A CORPORATION OF MASSACHUSETTS.

ELECTRIC-LIGHT SOCKET.

1,214,644.   Specification of Letters Patent.   Patented Feb. 6, 1917.

Application filed April 16, 1912. Serial No. 691,110.

*To all whom it may concern:*

Be it known that I, TONJES AUGUST CARL BOTH, a citizen of the United States, and a resident of Malden, in the county of Middlesex and State of Massachusetts, have invented certain new and useful Improvements in Electric-Light Sockets, of which the following is a specification, taken in connection with the accompanying drawings, which form a part of the same.

This invention relates to a mechanical movement adapted for universal application.

It further relates to switch mechanism for electric circuits and one which is adapted to make a quick make and a quick break of the current on the rotation, in either direction, of the driving member which in this invention is a resilient member.

My invention further relates to electric light sockets and a switch mechanism mounted therein.

It further relates to electric light key sockets in which the key and key shaft are formed of two or more removable members which can be connected or disconnected for shipment and storage and connected together after the electric light socket has been partly installed.

It further relates broadly to a removable key which is adapted to be removably connected to the key shaft and held to its position on the key shaft by some coöperating portion of the socket, or member carried by the socket. Further to such a removable key as will rotate in either direction to operate the switch mechanism.

My invention further relates to the combination of a husk, an electric light socket provided with a key shaft, and a key to be secured and held on its key shaft by some coöperating member or members carried by or attached to the key and the socket. Further to coöperating insulating sections and a coöperating screw shell or consuming holder having coöperating members to secure the screw shell and insulating sections together.

My invention further relates to certain details of construction and articles of manufacture which will be more fully hereinafter described in the specification and pointed out in the claims.

In the accompanying drawings showing illustrative embodiments of my invention and in which the same reference numerals refer to similar parts in the several figures, Figure 1 is a longitudinal vertical section through an electric light socket, equipped with my removable key and with my mechanical movement as a switch mechanism, and surrounded by a husk; Fig. 2 is a longitudinal vertical section substantially at right angles to Fig. 1 on the line 2—2 of Fig. 1, certain parts of the device being omitted; Fig. 3 is a plan view, partly broken away, of the insulating member of my socket, the key also being shown broken away; Fig. 4 is a horizontal section substantially on the line 4—4 of Fig. 1; Fig. 5 is a horizontal section on the line 5—5 of Fig. 2 looking in the direction of the arrows; Fig. 6 is a perspective view of a portion of the rotary resilient driving member when it is formed of a plurality of parts; Fig. 7 is a perspective view of the resilient part of the resilient driving member when that member is made of a plurality of parts; Fig. 8 is a plan view of the blank from which the driven member is preferably formed; Fig. 9 is a perspective view of the driven member; Fig. 10 is a detail sectional view showing the modified form of key and coöperating parts; Fig. 11 is a detail sectional view of a further modified form of key and coöperating parts to hold it in the socket; Fig. 12 is a detail sectional view of a further modification showing another manner of connecting the key to the socket; Fig. 13 is a detail vertical section substantially on the line 13, 13 of Fig. 1 showing one form of bushing mounted in the key which is adapted to coöperate with coöperating surfaces on the key shaft; Fig. 14 is a detail of a contact member carried by the driven member when my mechanical movement is to be used as a switch mechanism; Fig. 15 is a detail of a blank from which a modified form of driving member can be made; Fig. 16 is a detail of a modified form of resilient driving member made from the blank of Fig. 15; Fig. 17 is a detail showing a modified form of driving member; Fig. 18 is a detail showing another modification; Fig. 19, Sheet 3, is a vertical section of a modified form of insulating body and screw shell or holder for a consuming device; Fig. 20 is a detail view partly in section and partly in plan, showing the coöperating locking surfaces mounted on the insulating base and the screw shell or holder; Fig. 21 is a side elevation of the holder for the consuming device formed as a screw shell; Fig. 22 is a vertical section of a further modification showing a different manner of connecting the screw shell or consuming holder to the insulating body member; Fig. 23 is a detail horizontal section of the device shown in Fig. 22; and Fig. 24 is a side elevation of the holder for the consuming device used in Fig. 22, the holder being in the form of a screw shell.

In describing my invention, I will simply, for convenience, describe first the mechanical movement, for while I have shown this mechanical movement as the switch mechanism in an electric light socket, it is to be distinctly understood, as previously noted, that it is adapted for universal application, wherever such a movement is desirable, and, further, when used as an electric switch mechanism it is not to be confined to switch mechanism of electric light sockets.

In the illustrative embodiments of my invention shown in the drawings, 1 is the resilient rotary driving member, Figs. 1 and 7, which coöperates with the driven member 2 and causes it to reciprocate laterally with a quick and positive snap upon the rotation, in either direction, of the rotary resilient driving member 1. The particular form of this resilient driving member 1 is immaterial, provided that upon its rotation it causes the driven member 2 to reciprocate. Simply for convenience in manufacture, I form the driving member 1 of a plurality of parts. These parts are preferably two in number and formed from stampings, one of them being preferably the spring 3 and the other the disk 4, Figs. 1, 6 and 7. The spring member 3 has one end 5 bent back upon itself forming a bow 6. The disk 4 is preferably provided with a tongue 7 and shoulders 8, 8. In assembling the two sections 3 and 4 of the resilient driving member, the resilient member 3 is forced through the opening 9 of the disk 4, the surfaces 10, 10 of the resilient member being made to coöperate with the shoulders 8, 8 of the disk 4, and the lip 11 of the arm 5 is caused to engage with the surfaces 12 of the disk 4. The parts are so arranged that some slight pressure is necessary to force the bow 6 through the opening so that the bow will resiliently engage with the tongue 7 and be in this manner secured to the disk 4 and prevented from any relative movement with relation to it. The disk 4 is further provided with a non-circular aperture 13 to coöperate with the shoulders or fins 14, 14 upon the member 15 which, as my invention is shown in an electric light socket, is the key shaft of the socket. These shoulders or fins 14, 14 are preferably formed by compressing the member 15 by subjecting it to a blow or otherwise. This key shaft has a portion 16 extending through the disk 4 and serves as a bearing for one part of the driven member 2, it being understood that the coöperation of the non-circular opening 13 in the disk 4 and the shoulders 14, 14 on the member 15 causes the key shaft 15 and the disk 4 with its end 16 to rotate together. For economy in manufacture I make the axle 15, the disk 4 and the spring 1 as separate elements and combine them together in the manner described. In some instances, however, I may form the three members as one, as for example, in Fig. 17, in which the disk 17 is provided with the arms 18 and 19 and with the spring member 20. In this form of my invention the spring 20 serves to also coöperate directly with the driven member 2 when power is transmitted to the arm 18, in any suitable manner. The arm 19 serves as a support for one end of the driven member 2, performing the same function as the end 16 of the key shaft 15.

My driven member may be formed in various ways, but preferably from a blank 21, Fig. 8 having the ends 22, 23, the slot 24, the cross arm 121 and the cutout or recessed portions 25, 25, 26, 26, the ears 27, 27 and the cross-slots 28, 28. This blank is bent into the position shown in Fig. 9, the end 22 being bent up forming a bridge to rest on the extension 16 of the key shaft 15 or the surface 19 of the disk 17, Figs. 1 and 17, while the cross arm 121 engages the underside of the key shaft, the bridge 22 and cross arm 121 forming a bearing for the key shaft. The intermediate portion of the blank is bent to form two pairs of oppositely inclined surfaces 29 and 30, the two inclined surfaces being separated by the thickness of the metal or material from which the driven member is formed. In so bending the member the crotch 31 is formed at the foot of the inclined surfaces 29 and a similar crotch 32 is formed at the foot of the inclined surfaces 30. The end 23 is bent down at an angle to the inclined surfaces 29 and 30 so as to form in effect opposed cams 33 and 34 separated from each other by the inclined surfaces 29 and 30, the cams 33 and 34 being in different horizontal planes. In this bending up of the blank 21, the edges of the grooves 25, 25 and 26, 26 form shoulders 35, 35 and 36, 36 which coöperate with the free end of the spring member 37, Fig. 7, 38 in Fig. 17 and 39 in Fig. 16, depending upon which particular form of resilient driving member is employed.

The ears 27 are received in grooves 40, 40 in a support, Fig. 4, and serve to prevent the rotation of the driven member 2 as the resilient driving member is rotated but will permit the free reciprocation of the driven member. This driven member 2 is substantially Z-shaped and in portions of this specification is so referred to. It is to be understood, however, that any form of driven member performing the functions of my driven member and coming under the terms of my claims are a portion of my invention and that I am not to be confined to the particular form of this member shown by way of example.

In the mechanism so far described, whether it is used as an electric switch mechanism or not being immaterial, the rotation of the resilient driving member will cause the driven member 2 to reciprocate in its grooves 40, 40, Fig. 4, with a quick and positive snap, upon the rotation in either direction of the resilient driving member. Whether this driving member is formed of one, two or more parts, as shown for example in Figs. 16, 17 and 6, is immaterial. The rotation in either direction of the resilient driving member, which for purposes of description will be considered as formed of two parts, the preferred construction that illustrated in Figs. 6 and 7, will cause the free arm 37 of the spring 3 to bear first upon one of the inclined surfaces 29 or 30, as the case may be, and then upon the other. Assuming the parts to be in the position shown in Fig. 1, the driven member 2 is held from rotation by its ears 27 being received in the grooves 40, 40, Fig. 4. Its bridge 22 rests loosely upon the end 16 of the shaft 15 which extends through the slot 28 of the driven member a sufficient distance to compensate for the reciprocation of the driven member 2 and to always present a bearing for the bridge 22. The cross arm 121 is also preferably, though not necessarily, used to engage with the underside of the key shaft, as previously described. The cams 33 and 34 are mounted below and above, respectively, the longitudinal axis of the shaft 15. Upon rotating the resilient driven member, for example through the shaft 15, the disk 4 with the spring 3 is caused to revolve freely in the grooves 41, 41 in the support and carry with it the spring 3. As the driven member 2 cannot rotate, the free end 37 will be caused to engage alternately with the inclined surfaces 29 and 30, but in making this alternate engagement with these inclined surfaces, it will be alternately compressed and extended. In the position shown in Fig. 1, the free end 37 is at rest in the crotch 32 of the inclined surface 30, the spring being shown in its extended position. Upon rotating the axle 15, in either direction, the spring member 3 will be caused to move from the crotch 32 in the position shown in the cam surface 34 which is above, in Fig. 1, the longitudinal axis of the shaft 15. Therefore, when the disk 4 and the spring 3 have made a revolution up to substantially 110 degrees, the spring will have been compressed and energy will have been stored up in the spring until its surface 37 has made substantially a half revolution or one of 180 degrees when it will rest upon the elevated cam 34 and contact with the inclined surfaces 29. The moment this occurs, the resiliency of the spring asserts itself, the end 37 tending to move down the inclined surface 29 to reach the crotch 31. In making this movement, however, the entire driven member 2 is moved laterally to the right of Fig. 1 with a quick and positive snap.

I preferably, though not necessarily, employ the shoulders 35 and 36 which serve to engage with the ends 37, 38 or 39 of the different driven members, whichever one is used, and hold the resilient member until such time as the resilient driven member has made a half revolution of substantially 180 degrees when the shoulders cease to engage with the end of the resilient member, permitting it to slide freely upon the opposite inclined surfaces 29 and 30, as the case may be. After the end 37 of the spring member has been received in the crotch 31, the rotation of the axle 15 in either direction, will cause it to move out of the crotch 31 to the cam 33 of the inclined surface 30 when it will immediately move down the inclined surface 30 until it again reaches the crotch 32 in which position it is shown in Fig. 1. This latter movement will cause the entire driven member 2 to move to the left with a quick and positive snap. This alternate reciprocation of the driven member will continue upon substantially every half revolution of the resilient driving member. I have shown this mechanical movement for purposes of illustration as an electric switch mechanism, where it serves to make both a quick make or a quick break of the electric current upon the rotation, in either direction, of the resilient driving member. Further, I have shown for purposes of illustration the mechanical movement as a switch mechanism of an electric light key socket. My electric light key socket 42 is preferably formed of an insulating member 43 formed of a plurality of parts 44, 45, divided substantially along the longitudinal axis of the electric light socket having meeting faces 46, 46. The two complementary insulating sections 44, 45 are preferably molded from porcelain and without cross holes, each section being provided with an interior recess 47, the two recesses forming an interior chamber 48 to receive and house my mechanical movement which is here used as the switch mechanism. Each section 44, 45 is also provided with a groove 40 to receive and cooperate with the ears 27, 27 of the driven member 2. I also provide the sections 44 and 45 with semicircular grooves 41, 41 to receive the disk portion of the resilient driving member whatever its form may be. That is, whether the resilient member is formed of a plurality of parts, one of which is a separate disk such as 4, Fig. 6, or an integral disk such as 17, Fig. 17, or the integral disk 50, Fig. 16, or any equivalent construction.

My electric light socket is provided with a screw shell 51 having a bead or rib 52, or other suitable coöperating surfaces, to coöperate with the coöperating surfaces 53, 53 carried by the insulating sections 44 and 45. I also secure to the screw shell 51 in any suitable manner, preferably by making it integral, an electric contact 54, Fig. 1, which extends up into the chamber 48 formed by the recesses 47, 47. Spaced from this contact 54 is a contact 55, Fig. 1, carried by the binding post 56 upon which is also mounted the binding screw 57. This binding post 56 is secured to the insulating base 45 by means of the securing screw 58 which at the same time serves to secure the two sections 44, 45 together and to them the screw shell 51 by means of the coöperating engaging surfaces carried by the screw shell and the insulating sections. My socket is also provided with a center contact 59 carried by the binding post 60 upon which is mounted the binding screw 61. This binding post 60 is secured to the insulating member 44 by the screw 62, Fig. 3, which at the same time serves also to secure the sections 44 and 45 together. My socket is provided with the usual socket shell 63 and cap 64 forming a socket casing.

To permit the driven member of the switch mechanism to contact with the contacts 54 and 55, I provide it with any suitable arm or member for this purpose, which arm or member may be formed separate or integral with it. For cheapness in manufacture I preferably make this member separate and form it from a stamping so as to make a contact member 65 which will be received in the grooves 28, 28 of the driven member and have arms 66, 66 which will directly contact with the contacts 54 and 55. I preferably use this contact member 65 so that the contacts 54 and 55 may be placed some little distance from each other to prevent short circuiting. This contact member 65 may be formed integral with the member 2, if desired, as shown in Fig. 18.

From the preceding description of the operation of the mechanical movement, it will be apparent that upon the rotation of the key shaft 15 in either direction, the driver member will be reciprocated laterally to make either a quick make or a quick break, as the case may be, of the electric light current, without arcing.

Another portion of my invention is to provide a removable key for the key shaft and one which can be readily applied to the shaft, after the socket has for example been wired or partly installed. It can also, of course, be mounted on the key shaft for shipment or the sockets and keys may be shipped separately to avoid breaking and to permit a greater number to occupy the same space. Further, to provide such a key which will be held on the key shaft, directly or indirectly, through the instrumentality of the electric light socket and more particularly through the instrumentality, directly or indirectly, of the socket shell or cap, the two forming the socket casing. This is particularly advantageous when the electric light socket is surrounded by a husk such for example as 67. These husks are usually supported from the fixture 68 by passing them over the reduced portion 69 of the fixture and clamping them against the shoulder 70 by screwing up the nipple 71 of the socket shell so that they will be securely held between the nipple 71 and the shoulder 70 of the support 68, Fig. 1. In practice, these husks 67 are given various shapes and contours to embellish, or harmonize with, any particular form of electric installation so that their internal diameters vary within wide limits, some of them closely hugging the socket shell casing, formed of the socket shell 63 and the cap 64, while other husks will be enlarged or have a relatively great internal diameter or bell. Therefore, an electric light key socket with a key for example of a certain length will readily coöperate with a comparatively small husk, in that it will extend through the opening 72 a sufficient distance to permit the key to be readily turned without interfering with the husk, and yet not extend so far out from the husk as to mar the symmetry of the structure. If it is attempted to use the same socket with a relatively large husk, it is often found that the key is either not long enough to extend through the opening 72 of the husk, or if it does extend through the opening it does not extend a sufficient distance to permit the free rotation of the key. Such a structure is inoperative and moreover is one which is not pleasing to the eye. Furthermore, in the old form where the key and key shaft are immovably connected together, it is often troublesome to thread the key through the opening 72. This opening in the old form has to be, of course, sufficiently large to permit the largest portion of the key to readily pass through it forming thereby an excessively large opening, and one which tends to mar the artistic effect of the husk.

By my invention, I avoid the necessity of threading the enlarged portion 73 of the key 74 through the opening 72. On the contrary I make this opening 72 in the husk of just sufficient diameter to permit the ready passage of the end 75 of the key 74 which is passed through the opening 72 in the husk, preferably after the husk and cap have been assembled on the fixture 68 and just prior to connecting the socket shell 63 to the cap 64. My invention, therefore, includes an electric light key socket having a key shaft and a removable key. By forming the socket shell with the key shaft such as 15 of ordinary or standard length, I may combine with it removable keys of various lengths such for example as 74, Fig. 1, 76 Fig. 10, 77 Fig. 11, and 78 Fig. 12, so that it is not necessary for a jobber or dealer or workman to make a special length of key shaft for different diameters or contours of husks, or for them to carry in stock a large assortment of socket shells having keys to fit the different size husks. By my invention, it is merely necessary for the jobber to have in stock an electric light key socket with a key shaft of standard or short length (the internal or switch mechanism being entirely immaterial in this portion of my invention) and to carry in stock different lengths of keys to coöperate with the standard key shaft to compensate for the different bells, diameters or contours of the different sized husks. By my invention, therefore, less capital has to be invested and by having in stock a series of keys of different lengths the jobber or workman can always fit a particular length of key to the standard short key shaft to coöperate with any size husk not only to obtain a key which will extend out from the husk a sufficient distance to permit it to be readily turned, but one which will extend out from the husk unobtrusively and which will best harmonize with the electric installation. The different keys are held from lateral movement to keep them from becoming disengaged from the key shaft in any suitable manner. I have shown by way of example, but to which my invention is not to be limited, the socket casing coöperating with some member mounted on or coöperating with the key so that after being once positioned the key will not become accidentally disengaged from the key shaft.

In Fig. 1 I have shown the insulating key 74 provided with a flange 75 which is received in semi-circular recesses 80, 80 in the two insulating portions 44 and 45, the cap 64 and the shell 63 having portions which coöperate with the flange 75 and prevent the key from becoming disengaged from the key shaft 15 until the cap and shell have been disconnected. Instead of forming semi-circular grooves in the insulating sections 44 and 45, the two forming a circular groove, I may cut off the insulating section 81 at 82, Figs. 10 and 11, so that the head or flange 83 of the key 76 may abut against the surface 82 and be held on the key shaft 15 by the socket shell 63 and the cap 64 in the same manner as shown in Fig. 1.

Various modifications all coming within the terms of my invention may be made. I have shown by way of example two such modifications in Figs. 11 and 12, but it is, of course, to be understood that these are not the only modifications which would come within the terms of my invention. In Fig. 11, I have shown the key 77 provided with a groove 84 within which is received the socket casing and in Fig. 12 I have shown the key 78 provided with a groove 85 within which is mounted a ring 86 which coöperates with the socket casing to prevent accidental endwise movement of the removable key after it has once been positioned on its key shaft 15 and held thereto by the casing. The removable keys may be formed of various coöperating surfaces to coöperate with the key shaft 15. It is only necessary that the key shaft 15 and the removable key have coöperating engaging surfaces which will cause them to rotate together when connected. Preferably I provide the removable key with an interior metal bushing 87, Figs. 1 and 13, which is simply a mashed or crushed tube, so that it will be non-circular in cross section, Fig. 13, and have portions 88, 88 to coöperate with the fins 89 on the key shaft 15. It is to be understood, however, that any other suitable form of coöperating surface may be mounted in the key and that while I preferably form the key of insulating material it may be formed of conducting material when the switch mechanism is such as to permit the use of a metal key, it being understood that this portion of my invention is entirely separate and distinct from any particular form of switch mechanism.

Another portion of my invention comprises a key provided with means which will always indicate, without the aid of any other part, whether or not current is passing through a consuming device as for example, an electric heater or an electric light which might be mounted so as not to be visible to a person near the key or socket. To accomplish this purpose I provide the key 73 with a pointer 100 or similar member so that it will always be in one position to indicate the passing of the current through the consuming device. I have shown this position in Fig. 1 pointing up which position, as the switch mechanism is there adjusted, the pointer will always assume when the current is off. When it is pointing in the opposite direction or downward, the current will always be on or passing through the consuming device whatever the consuming device may be. It is to be particularly noted that the pointer does not coöperate with any insignia or marks of any kind on the socket shell or any other member to indicate the passage of the current, but on the contrary the mere position of the pointer 100 will alone determine whether or not the current is on or off. This portion of my invention is entirely independent of any particular form of socket or switch mechanism.

Another portion of my invention comprises an insulating base formed of a plurality of parts and provided with engaging surfaces to coöperate with coöperating engaging surfaces on a screw shell or other holding device.

One form of my invention is an insulating base 101, Fig. 19, formed of two complementary parts 102 and 103 having meeting surfaces 104, 104 extending substantially longitudinally of the socket and provided with one or more notches or openings 105 to receive the ears 106. The notches may be variously formed but are preferably molded in the porcelain, one or more being located in each insulating section 102 and 103. The ears 106 may also be variously formed but preferably are simply struck out of the material of the screw shell 107, Figs. 19 and 20. In assembling the screw shell or holding device 107 with the insulating base 101 it is merely necessary to bring the notches or openings 105 into register with the ears 106 and secure the two sections 102 and 103 together in any suitable manner. I have shown a single locking screw 110 for this purpose, its end 111 engaging with the binding plate 112 to which is secured in any suitable manner the center contact 109 which passes through the opening 108 in the screw shell 107. I have also shown the insulating sections 102 and 103 provided with the recesses 113, 113 which may be employed either to form an interior chamber for a switch mechanism, or when the electric light socket is not to be used with a switch mechanism these openings 113 save insulating material, though, of course, the two insulating members 102 and 103 may be molded solid with no such openings 113 if so desired.

Another portion of my invention comprises an insulating body member formed of a plurality of parts one of which is adapted to be independently secured to the screw shell, or holding member for the consuming device, and another portion of the insulating body member having engaging surfaces to coöperate with coöperating engaging surfaces carried by the screw shell or holding member to detachably secure the two together. In Fig. 22 I have illustrated such a socket, the insulating body member 115 being formed of a plurality of parts, as for example the two complementary parts 116 and 117. The screw shell or other holder for the consuming device 118 is provided with a member 119 by means of which the screw shell 118 is independently secured to one of the sections of the insulating base for example 116 by a suitable coöperating member for example the screw 120. I have shown the member 119 riveted to the top 121 of the screw shell, though of course, my invention is not to be limited to such a member 119 or any particular means of securing it to the screw shell. All that is necessary in this part of my invention is that some portion of the member carried by the screw shell is adapted to be securely held to one of the sections of the insulating base, so that the screw shell and that part of the insulating base may be considered as one member, the coöperating section of the insulating base 117 being afterward secured to the other section. I also preferably provide the screw shell 118 and the independent insulating member 117 with coöperating engaging surfaces so that that section 117 will also assist in securing the screw shell to the insulating section 115. These surfaces may be variously formed. Preferably I provide an ear 122 on the screw shell 118 by pressing, bending or stamping out a portion of the screw shell and form one or more notches or openings 123 in the independent insulating section 117, one of which is adapted to coöperate with the ear 122. The two insulating sections 116 and 117 are connected together by the locking screw 124 which at the same time assists the screw 120 in securing the screw shell 118 to the insulating section 115 by holding the coöperating surfaces 122 and 123 in engagement. The member 119, which is employed to secure the screw shell 118 to the insulating section 116, I also preferably employ as a binding post and provide it with a binding screw 125. The socket is also provided with the center contact 126 which is held to the socket in any suitable manner as by the locking screw 124.

My electric light socket, Fig. 22, may be used either with or without switch mechanism. When switch mechanism is employed it is mounted in the chamber 127 formed by the coöperating recesses 128, 128 preferably formed in each of the insulating sections 116 and 117. It is, of course, to be understood that in the portion of my invention illustrated in Figs. 19 and 22, if switch mechanism is employed, it may be of any approved construction.

Having thus described this invention in connection with the illustrative embodiments thereof to the details of which I do not desire to be limited, what is claimed as new and what is desired to secure by Letters Patent is set forth in the appended claims.

1. An electric light socket comprising contacts; a rotary resilient operating member; a reciprocating member, having longitudinal movement with relation to the operating member and provided with opposite inclined bearing surfaces coöperating with the resilient rotary member to reciprocate the reciprocating member to make and break the circuit through said contacts.

2. An electric light socket comprising contacts; a rotary resilient operating member; a longitudinally reciprocating member operated by the operating member to bridge said contacts; and means to prevent longitudinal movement of the operating member.

3. An electric light socket comprising contacts; a rotary resilient operating member; and a reciprocating member operated by the operating member to bridge said contacts and having longitudinal movement with relation to the operating member to bridge said contacts.

4. An electric light socket comprising contacts; a rotary resilient operating member including a disk, a spring secured to the disk, and a reciprocating member provided with opposite inclined surfaces to coöperate with the spring, said reciprocating member bridging said contacts.

5. An electric light socket comprising contacts; a rotary resilient operating member and a reciprocating member provided with opposite inclined surfaces and with engaging members all of which coöperate with the rotary resilient member, said reciprocating member being movable to bridge said contacts.

6. An electric light socket comprising contacts; a rotary resilient operating member including a disk provided with an aperture; a tongue, a spring mounted in the aperture of the disk and coöperating with the tongue and a reciprocating member provided with opposite inclined surfaces to coöperate with the spring, said reciprocating member being movable to operate said contacts.

7. An article of manufacture for electric light sockets comprising an operating member including an operating handle, a recessed member and a spring secured in the recess of said member and secured against movement with relation to the operating handle.

8. An article of manufacture for electric light sockets comprising a rigid movable member provided with a longitudinally extending slot and with oppositely inclined engaging surfaces.

9. An article of manufacture for electric light sockets comprising a rigid reciprocating member stamped from sheet metal and provided with a longitudinally extending slot, oppositely inclined surfaces and a bridge.

10. In electric sockets, the combination of a resilient driving member, a driven member provided with two oppositely inclined surfaces acting to put the resilient driving member under tension and two spaced contacts, said resilient driving member directly contacting with the inclined surfaces of the driven member to be thereby put under tension and cause the driven member to make and break the electrical connection between said contacts to make a quick make or a quick break of the current.

11. In electric light sockets, the combination of a reciprocating driven member provided with oppositely inclined portions acting to put the rotary resilient driving member under tension, a rotary resilient driving member, two spaced contacts, said reciprocating driven member coöperating with the rotary resilient driving member to put it under tension and thereby cause the driven member to reciprocate to make a quick break or a quick make of the current.

12. In electric light sockets, the combination of a key shaft, a rotary resilient driving member coöperating with the key shaft of the socket, a reciprocating driven contact member provided with oppositely inclined surfaces to coöperate with the rotary resilient driving member, and with means to coöperate with the key shaft of the socket.

13. In electric light sockets, the combination of a rotary resilient driving member coöperating with the key shaft of the socket, a key shaft, a reciprocating driven contact member provided with a slot to receive a portion of the key shaft and with oppositely inclined surfaces to coöperate with the resilient rotary driving member.

14. In electric light sockets, the combination of an insulating member provided with guide grooves, a rotary resilient driving member coöperating with the key shaft of the socket, a key shaft, a reciprocating driven contact member provided with a slot to receive a portion of the key shaft and with one or more ears to coöperate with the guide grooves in the insulating member and with oppositely inclined surfaces to coöperate with the resilient driving member.

15. In electric light key socket, the combination of an electric light socket including a key shaft and a removable key and a spline connection between the two, and means partly carried by the key and partly by the socket to prevent accidental disengagement of the key and key shaft.

TONJES AUGUST CARL BOTH.

Witnesses:
FRANK S. SIAS,
RALPH A. SCHOENBERG.